Aug. 21, 1934.  H. CONRADS ET AL  1,971,250
DROP PLANTER BOX ATTACHMENT
Filed Aug. 13, 1932   2 Sheets-Sheet 1
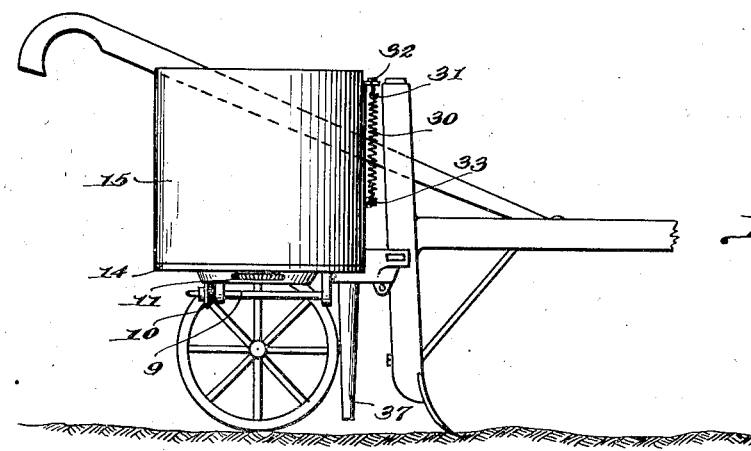
Fig. 1.
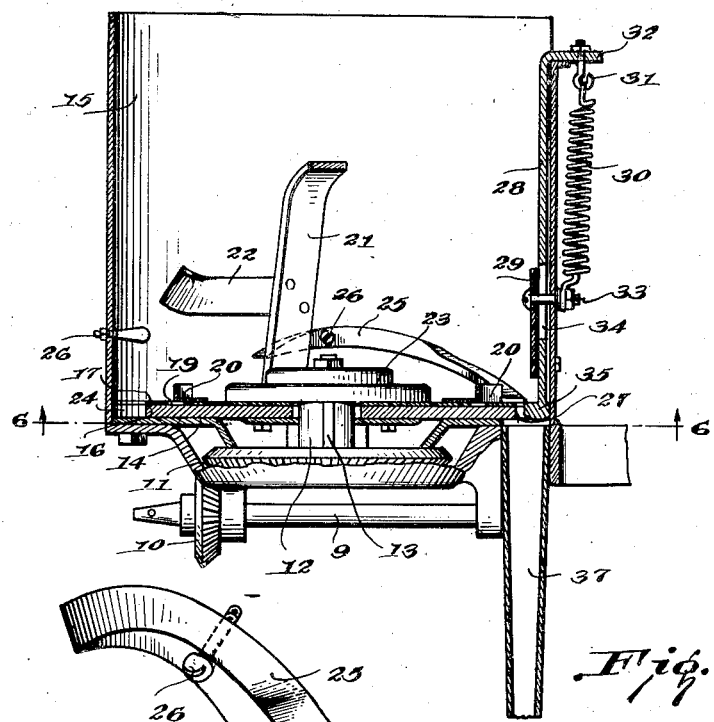
Fig. 2.
Fig. 3.
Fig. 4.
Inventors
H. Conrads and
L. A. Laas
By Eugene E. Stevens
Attorney Aug. 21, 1934.   H. CONRADS ET AL   1,971,250
DROP PLANTER BOX ATTACHMENT
Filed Aug. 13, 1932   2 Sheets-Sheet 2

Inventors
H. Conrads and
L. A. Laas

By Eugene C. Stevens
Attorney

Patented Aug. 21, 1934

1,971,250

UNITED STATES PATENT OFFICE 1,971,250

DROP PLANTER BOX ATTACHMENT

Herman Conrads and Louis A. Laas, Maxwell, Tex.; said Laas assignor to O. M. Hoffman, Caldwell County, Tex.

Application August 13, 1932, Serial No. 628,731

1 Claim. (Cl. 221—141)

My invention relates to a seed dropping box for hill planters.

An important object of my invention is to provide a planter box of the revolving plate type which will drop cotton or other seed at varied but uniform distances apart.

A further object is to provide a device in which the quantity of seed dropped may be regulated by the adjustment of the planter plates.

Another object of my invention is to provide a seed dropping box which has seed agitating and guiding means and in which plates with a varied number of seed receiving slots may be used.

A still further object is to provide means for pressing the seed into the plate slots and for positively discharging the seed from the slots so that the seeds will be deposited in the ground in a close or concentrated group.

Other objects and advantages of construction and utility will be apparent from a study of the following description and accompanying drawings in which:

Figure 1 is a view of my planter box mounted on a conventional seed planter;

Figure 2 is a vertical section taken through the seed box;

Figure 3 is a perspective of the seed ejector;

Figure 4 is a perspective of the seed presser for loading the seed pockets in the plates;

Figure 5:
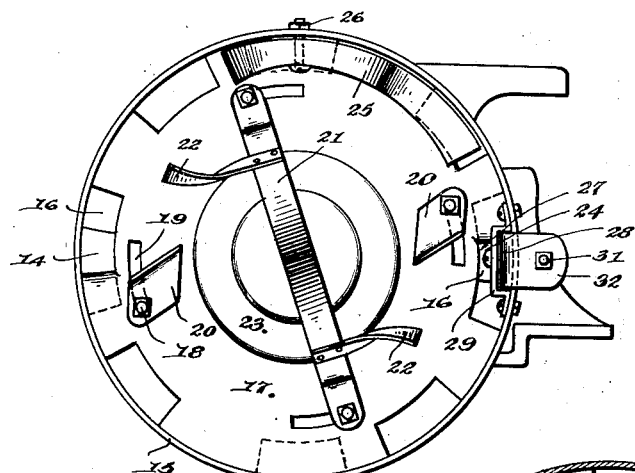
Figure 5 is a plan view of the planter box with the cover removed.

In the drawings which illustrate a preferred embodiment of my invention and in which like numerals are used to designate like parts throughout the same, the numeral 9 designates a shaft turned by the running gear of the planter and having a pinion gear 10 fixed to same meshing with the gear 11. A shaft 12 having keys 13 is rigidly fixed to the gear 11 and extends upwards through a central opening in the bottom 14 of the planter box, said box having a circular side wall designated as 15. A pair of circular discs or plates of a diameter equal to that of the seed box fit over the upper end of the shaft 12, the lower plate 16 being rigidly fixed on the said shaft by means of the keys 13 while the upper plate 17 rides above the tops of the keys thus being rotatable in relation to the lower plate 16.

The plates are held in the desired relationship by means of bolts 18 passed through holes in the lower plate 16 into slots 19 in the upper plate 17. On two oppositely disposed bolts 18 are placed seed guides 20 which are formed preferably of sheet metal with one edge turned upwards. These guides are positioned so as to throw the seed outwardly toward the seed box wall. Nuts are then tightened down on the bolts thus clamping both plates and the seed guides tightly together. On the other two oppositely disposed bolts 18 is clamped an inverted U-shaped seed stirrer 21 having projecting stirring wings 22 for agitating the seeds above the rotating plates. A cap 23 threaded to the top of the shaft 12 holds the revolving plates against the bottom of the seed box.

The revolving plates 16, 17 have similar segments 24 cut out of their outer peripheries and by means of the rotative adjustment between the two plates made possible by the slots 19 in the upper plate 17 the size of the openings through both plates may be regulated according to the amount of seed it is desired to drop at one time. The bottom 14 of the seed box acts as the bottom of the seed pockets so formed.

A seed presser 25 (shown in Figure 4) is pivotally fixed to the seed box wall by means of a bolt 26, the lower end of the same riding directly over the seed pockets formed in the outer edges of the rotating plates 16, 17. The seed presser 25 being pivoted near its upper end, its lower end always rides on the peripheries of the revolving plates 16, 17, thus loading or pressing the seed into the seed pockets of the plates as they pass underneath. Two or more of these seed pressers may be used, an extra bolt 26 being shown in Figure 2.

Mounted inside of the seed box directly over a seed discharge opening 27 in the bottom 14 of the seed box is a plunger 28 of the trip-hammer type for discharging the seed from the seed pockets into the discharge opening 27, said plunger being best shown in Figure 3. This plunger 28 is held or guided against the seed box wall 15 by means of a guide piece 29 and is given a continuous downward pressure by means of the spring 30 adjacent the outer wall of the seed box. The spring 30 is attached to the upper end of the plunger 28 by means of a hook 31 fastened to the outwardly bent top 32 of said plunger and is anchored at its lower end to a bolt 33 which pierces the guide piece 29 and seed box wall 15 and passes through a slot 34 in the plunger 28. An enlarged foot portion 35 is formed on the lower end of the plunger 28, the bottom or striking surface of same slanting back at an angle forming a projecting corner 36 which will drive into the seed pockets when same have been shortened by adjustment of the plates 16, 17. A seed spout 37 is provided to carry the discharged seed to the ground.

Figure 6:
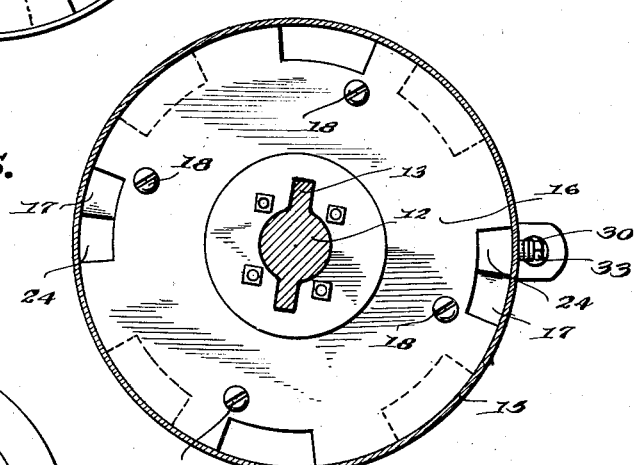
Figure 6 is a section taken on the line 6—6 of Figure 2.
Figure 7:
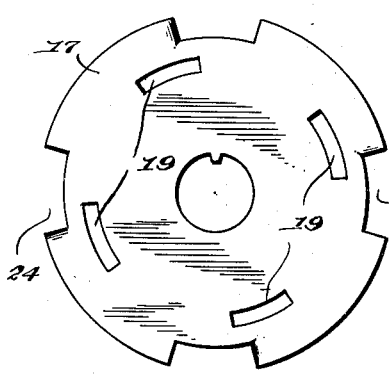
Figure 7 is a plan of the upper plate used in Figure 6.
Figure 8:
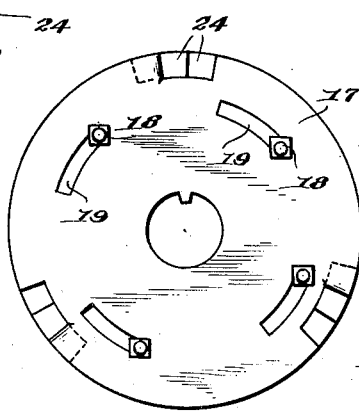
Figure 8 is a substitute plate assembly which provides three seed receiving slots.

The superfluous cutout portions 24, shown in dotted lines in Figures 5 and 6 are used when it is desired to form four seed pockets instead of the two shown. Figure 8 shows a substitute set of plates which form three seed pockets. Plates with one, five or six seed pockets may also be substituted.

In operation plates 16, 17 are adjusted to form seed pockets of the desired size and the planter box is filled with seed. Through the gears 10, 11 and the shaft 12 the plates 16, 17 are rotated in a clockwise direction. The stirring elements 21, 22 rotating with the plates agitate the seed and prevent its packing in the seed box above the plates. The seed on the upper plate 17 is thrown towards the seed box walls by the seed guides 20 where it is caught under the seed presser 25 and forced into the seed pockets formed on the outer edges of the plate 16, 17 by means of the cutout segments 24 in said plates. As the seed pocket so loaded passes over the discharge opening 27 the spring pressed plunger 28 drives into it kicking the seed down the spout 37 to the ground.

The advantage of this positive discharge of the seed is that the seeds are planted in a close grouped bunch which in the case of planting in hard crusty soil enables the sprouted seeds to more easily force their way up through the surface.

The idea of the adjustable and interchangeable plates 16, 17 permits varied spacing of the seed hills and also enables the operator to regulate the amount of seed planted in each hill, the last named advantage cutting the costs of thinning or chopping out the growing plants which is often necessary when too many seeds are planted in one hill and also preventing a waste of seed.

It is to be understood that the form of my invention herewith shown and described is to be taken as a preferred embodiment of the same and that changes in shape, size, and arrangement of parts may be resorted to without departing from the spirit of the invention or the scope of the subjoined claim.

What I wish to claim by Letters Patent is:

A seed dropping box for hill planters having a rotating element in the bottom of the same, said rotating element comprising a pair of connected plates having segments cut out of their outer peripheries, the said plates being rotatively adjustable in relation to each other, means for holding the plates in their desired relation, said means also holding seed guides to the upper plates, means for packing seed into the pockets formed by the cutout segments in the plates, and means for discharging the seed from the pockets.

HERMAN CONRADS.
LOUIS A. LAAS.